United States Patent [19]

Yabe et al.

[11] Patent Number: 4,810,869

[45] Date of Patent: Mar. 7, 1989

[54] AUTOMATIC FOCUSING CONTROL METHOD FOR MICROSCOPE

[75] Inventors: Ryohei Yabe; Hajime Matsushita, both of Katsuta, Japan

[73] Assignee: Hitachi, Ltd., Tokyo, Japan

[21] Appl. No.: 136,933

[22] Filed: Dec. 23, 1987

[30] Foreign Application Priority Data

Dec. 27, 1986 [JP] Japan .............................. 61-313824

[51] Int. Cl.[4] .............................................. G01J 1/20
[52] U.S. Cl. ..................................... 250/201; 250/204
[58] Field of Search ....................... 250/201, 204, 216; 356/1, 4; 254/404, 406, 407, 408; 350/518, 519, 530

[56] References Cited

U.S. PATENT DOCUMENTS 4,633,073  12/1986  Horikawa ............................. 354/406
4,661,692  4/1987   Kawasaki ............................. 250/201

*Primary Examiner*—David C. Nelms
*Attorney, Agent, or Firm*—Fay, Sharpe, Beall, Fagan, Minnich & McKee

[57] ABSTRACT

An automatic focusing control method for microscope includes preliminarily determining and storing respective in-focus positions of an objective lens of the microscope for a plurality of points on a stage of the microscope prior to observation and measurement of a sample by the microscope. Upon actual measurement after the sample has been mounted on the microscope stage, an approximate in-focus position of the objective lens for the sample is determined on the basis of the stored in-focus positions of the objective lens for at least one of the plurality of points in the vicinity of the sample. Then, the objective lens is moved to the determined approximate in-focus position at a high speed, and a usual automatic focusing is thereafter carried out, thereby making it possible to perform the automatic focusing operation rapidly and accurately.

8 Claims, 4 Drawing Sheets

F I G. 1
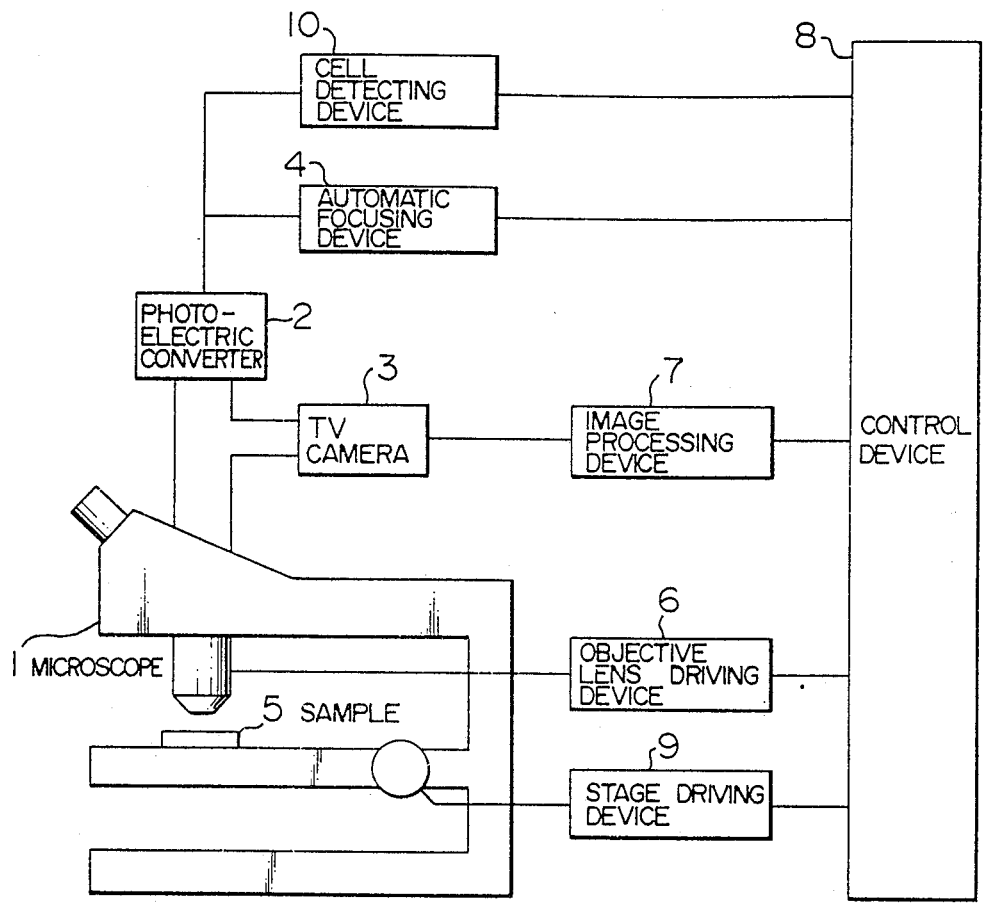

AUTOMATIC FOCUSING CONTROL METHOD FOR MICROSCOPE

BACKGROUND OF THE INVENTION

The present invention relates to an automatic focusing control method for microscope, more particularly to such a method suitable for use in an automatic cell differentiation apparatus based on a pattern recognition using a microscope.

In the conventional automatic focusing control for a microscope, importance was attached to an accurate and rapid automatic focusing for a certain point in a view field of the microscope. Prior art examples of the automatic focusing control for microscope are disclosed by JP-A No. 59-94711 and JP-A No. 59-100406. However, in spite of the fact that in the case of using an objective lens of high magnification (for example, 100 magnifications) a focal depth of the lens becomes so shallow as about 0.2 $\mu$m, any correction for the displacement of a focal point resulting from a mechanical distortion of a movable stage of the microscope in upward and downward directions associated with the movement of the stage was not taken into consideration. Namely, no account was taken of an automatic focusing control for a blurred focus resulting from a change in relative distance between the objective lens and the microscope stage when the microscope stage is driven. As a result, the prior art involves a problem that a long time is required for the automatic focusing or the automatic focusing cannot be performed in an extreme case.

SUMMARY OF THE INVENTION

An object of the present invention is to solve the above-mentioned problem or to provide an automatic focusing control method for microscope capable of effecting a rapid and accurate automatic focusing by preliminarily correcting the displacement of a focal point resulting from any distortion of a relative distance between a microscope stage and an objective lens.

According to the present invention, prior to observation and measurement of a sample by use of a microscope, in-focus positions of an objective lens for a plurality of points on a stage of the microscope is preliminarily determined and stored. Upon actual measurement after the sample to be measured has been mounted on the microscope stage, an approximate in-focus position of the objective lens for the sample is determined on the basis of the preliminarily stored in-focus positions of the objective lens for at least one of the plurality of points in the vicinity of the sample. Then, the objective lens is moved to the determined approximate in-focus position at a high speed, and a usual automatic focusing operation is thereafter performed.

More especially, in a stage where any sample for compensation is mounted on the microscope stage, the automatic focusing operation is preliminarily carried out for a plurality of any given points on the microscope stage so that in-focus positions of the objective lens for the respective points on the microscope stage are determined and stored in a control device such as computer. Once this process is carried out, the in-focus positions of the objective lens for the respective points on the microscope stage are stored. This stored information can be used over a considerable long term so long as the microscope stage does not encounter its aging change. In a state where the sample is mounted on the microscope stage, an in-focus position of the objective lens for the sample, i.e. a point to be measured can be approximately determined on the basis of position information of at least one of the plural points in the vicinity of the point to be measured through interpolation or exterpolation, and subsequently the automatic focusing operation is performed starting from the determined approximate in-focus position of the objective lens for the point to be measured.

BRIEF DESCRIPTION OF THE DRAWINGS

FIG. 1 is a block diagram showing an example of an automated blood cell differential counter useful for explaining an embodiment of an automatic focusing control method for microscope according to the present invention;

DESCRIPTION OF THE PREFERRED EMBODIMENTS

Figure 2:
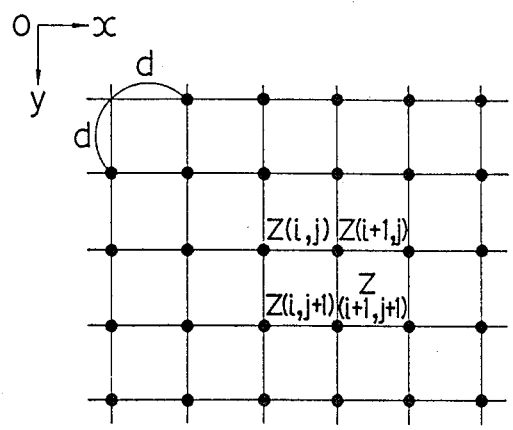
FIG. 2 shows a general illustration of lattice-like points on a microscope stage used for compensation.

An embodiment of an automatic focusing control method for microscope according to the present invention will now be explained in detail by virtue of FIGS. 1-3, 5A and 5B.

FIG. 1 is a block diagram showing an example of an automatic cell differentiation apparatus useful for explaining the embodiment of the automatic focusing control for microscope according to the present invention. Referring to FIG. 1, a photo-electric converter 2 and a television (TV) camera 3 are attached to a microscope 1 so that a microscopic image of a sample 5 containing sporadically scattered cells and placed on a stage of the microscope 1 is inputted to the photo-electric converter 2 and the TV camera 3. An electric signal outputted from the photo-electric converter 2 is supplied to an automatic focusing device 4 which in turn delivers a focus signal inversely proportional to the deviation from an in-focus (or the best focal point). A control device 8 has a microcomputer incorporated therein and controls an objective lens driving device 6 in accordance with the focus signal from the automatic focusing device 4, thereby performing an automatic focusing operation. After the automatic focusing operation has been completed, the TV camera 3 delivers a density or concentration signal of the microscopic image of the cell in the sample 5 within the view field of the microscope 1 to an image processing device 7 which in turn outputs characteristic parameters of the cell to the control device 8. The characteristic parameters of the cell include the area and density of a cell nucleus, the area and density of a cell cytoplasma, etc. The control device 8 differentiates or classifies the cell, for example, white blood corpuscles. After the cell differentiation has been completed, the differentiation of other cells (for example, red blood corpuscles) within the view field of the microscope 1 is carried out, or the microscope stage is moved by the stage driving device 9 until the detection of a next target cell (for example, white blood corpuscles) by a cell detecting device 10 is performed.

Before performing the cell differentiation, the in-focus positions of the objective lens for a plurality of points which may be arranged in a lattice or grid form on the microscope stage (hereinafter referred to lattice points), are preliminarily determined and stored. Namely, lattice points are allotted on a sample at any given interval d (which is determined in accordance with the precision of the microscope stage but may be different for the x- and y-directions), and the in-focus positions z(i, j), z(i+1, j), z(i, j+1), z(i+1, j+1), etc. of the objective lens at which the focus is taken to the lattice points respectively, are determined and stored in a memory of the microcomputer included in the control device 8.

Next, a procedure will be described in the case where the actual measurement is performed using a matrix of the above-determined in-focus positions of the objective lens.

Figure 3:
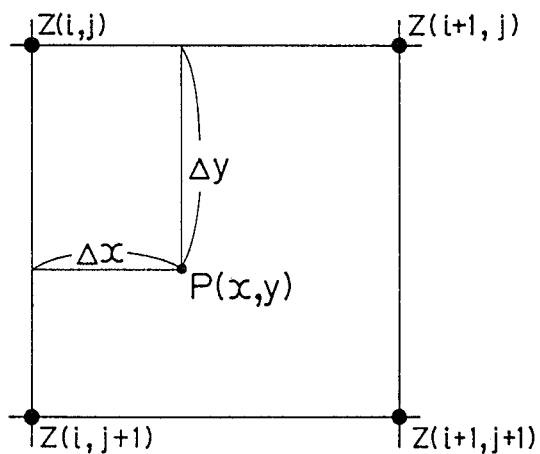
FIG. 3 shows a general illustration useful for explaining a method of compensation.

Assume that a point to be measured is a point P shown in FIG. 3 and the distance to the point P from one of the lattice points in the vicinity of the point P and nearest to the origin O is $\Delta x$ in the x-direction and $\Delta y$ in the y-direction, an approximate in-focus position z(P) of the objective lens for the point P is calculated by the following equation (1)

$$z(P)=\{(d-\Delta x)\cdot z_1+\Delta x\cdot z_2\}/d \quad (1)$$

where $z_1$ and $z_2$ are defined by $$z_1=\{(d-\Delta y)\cdot z(i,j)+\Delta y\cdot z(i,j+1)\}/d$$

$$z_2=\{(d-\Delta y)\cdot z(i+1,j)+\Delta y\cdot z(i+1,j+1)\}/d.$$

By moving the objective lens to the calculated position z(P) and carrying out an automatic focusing operation while starting from this position z(P), it is possible to perform the automatic focusing operation starting from the position in the vicinity of a true in-focus position of the objective lens for the point P, thereby making it possible to shorten a time required for the automatic focusing operation. Also, there can be prevented an inconvenience that in the case where the stage is moved over a long distance, the automatic focusing may become impossible due to a great deviation of the focal position resulting from such a movement of the stage. In the present embodiment, the selection of ones among the plural lattice points on the stage in the vicinity of the sample is made for simplicity of calculation of z(P). Therefore, a lattice point(s) which is not near to the sample may be selected for the determination of z(P).

Figure 4:
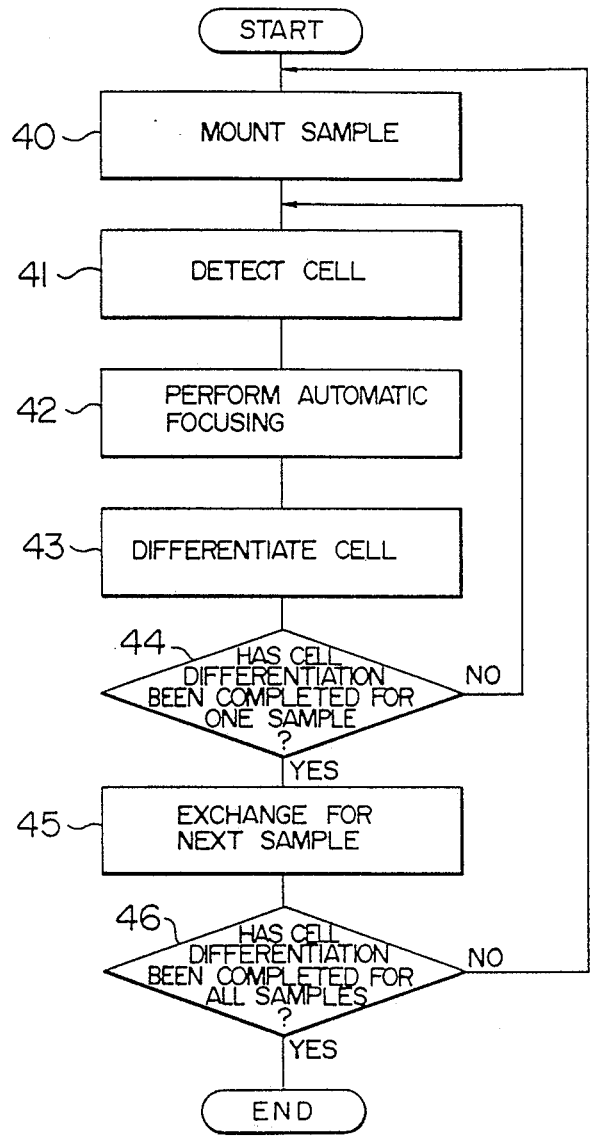
FIG. 4 is a flow chart showing an example of the conventional automatic focusing control method for microscope.

Prior to the detailed explanation of a cell differentiation process using the automatic focusing control method for microscope according to the embodiment of the present invention, the flow of a cell differentiation using the conventional automatic focusing control method for microscope will be explained by virtue of FIGS. 1 and 4. First, a sample to be measured is set or mounted onto the stage of the microscope 1 (step 40 in FIG. 4). The detection of a cell to be differentiated is made by the cell detecting device 10 while moving the stage (step 41). After the cell has been detected, the stage is moved by the stage driving device 9 so that the detected cell is positioned at a central portion of the view field of the microscope 1. After such positioning of the stage, an automatic focusing is carried out by the automatic focusing device 4 (step 42). At this time, if the position of the objective lens is remarkably deviated from its in-focus position due to the distortion of the stage, etc., a long time is required for effecting the automatic focusing or the automatic focusing may be impossible at the most inconvenient case. After the automatic focusing has been performed, the microscopic image of the cell is converted into an electric signal by the TV camera 3 so that the cell differentiation is performed by the image processing device 7 and the control device 8 (step 43). In step 44 after the cell differentiation, whether or not the number of differentiated cells reaches a predetermined number is determined. If the predetermined number is not reached, the process is returned to step 41 for the detection of the next cell in the sample. When the predetermined number is reached, the sample is exchanged for the next sample to be measured (step 45) to effect the cell differentiation for the next sample. The above process is repeated until step 46 detects the completion of the cell differentiation for all samples.

Figure 5A:
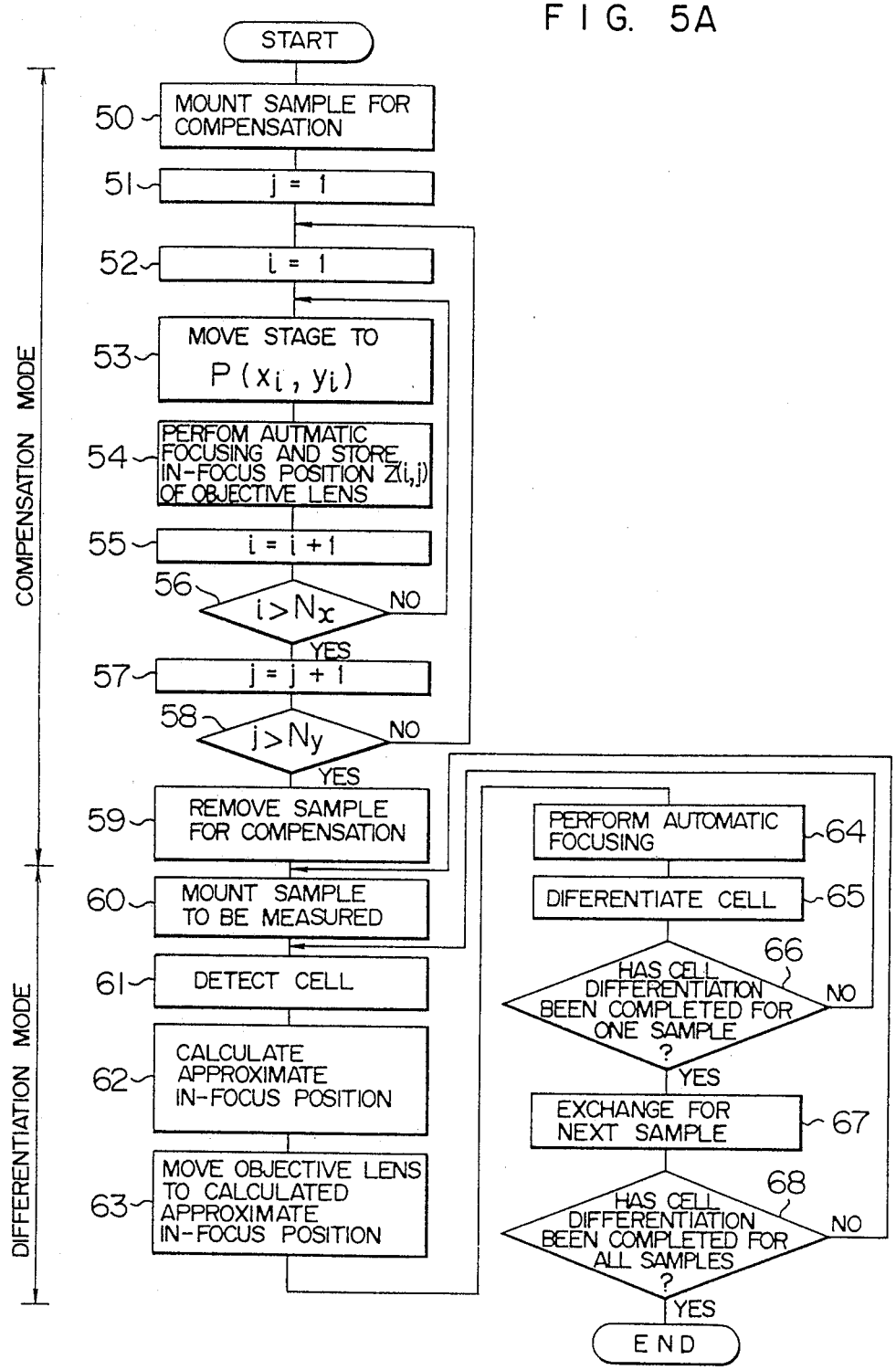
FIG. 5A is a flow chart showing an example of the automatic focusing control method for microscope according to the present invention.
Figure 5B:
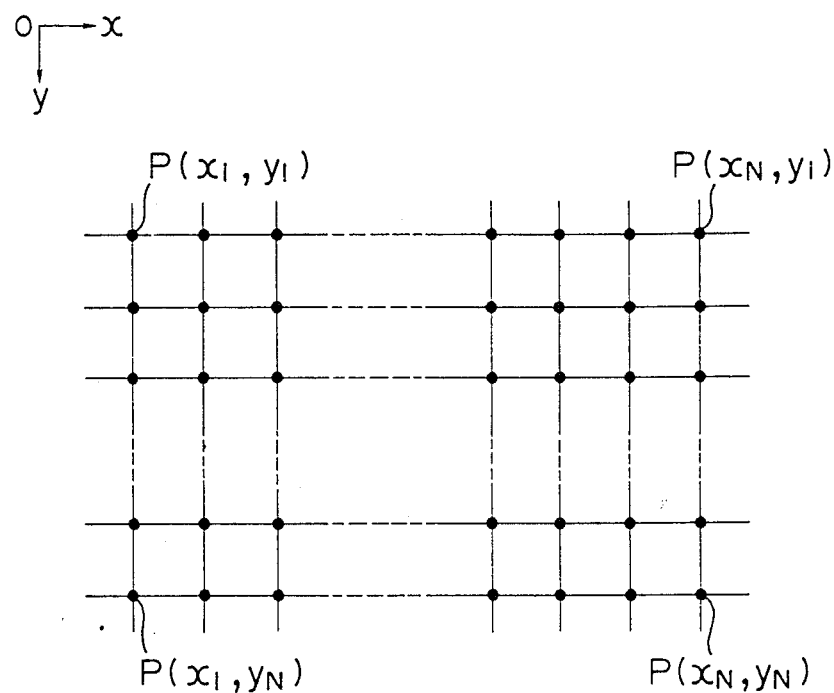
FIG. 5B shows a general illustration of lattice-like points on a microscope stage useful for explaining a compensation mode in FIG. 5A.

FIG. 5A shows a flow chart of a cell differentiation process using the automatic focusing control method for microscope according to the embodiment of the present invention. Prior to the starting of measurement or cell differentiation, a compensation or correction mode is carried out so that respective in-focus positions of the objective lens for a plurality of lattice points on the microscope stage are determined and stored. Namely, any sample for compensation is set or mounted onto the stage (step 50 in FIG. 5A). For one y-direction (step 51), while the stage is sequentially moved along the x-direction from a lattice point $P(x_1, y_1)$ to lattice points $P(x_2, y_1)$, $P(x_3, y_1)$, ..., $P(x_N, y_1)$ shown in FIG. 5B, the in-focus positions z(1, 1), z(2, 1), z(3, 1), ..., z(N, 1) of the objective lens for those lattice points are determined and stored (steps 52 to 55) until step 56 detects the termination of the stage movement along the x-direction. After the stage movement along the x-direction for the one y-direction has been terminated, the stage is moved in the y-direction by one step (step 57) and is returned to the initial position in the x-direction (step 52) so that the above process is repeated for $P(x_1, y_2)$, $P(x_2, y_2)$, $P(x_3, y_2)$, ..., $P(x_N, y_2)$. A similar process is performed for the entire area to be measured until step 58 detects the termination of the stage movement in the y-direction. Upon completion of the above-mentioned compensation mode, the sample for compensation is removed from the stage (step 59).

Now, the process proceeds to a differentiation mode. First, a sample to be measured is set or mounted onto the stage (step 60). In step 61 corresponding to step 41 in FIG. 4, the detection of a cell to be differentiated in the sample is made by the cell detecting device 10. After the cell has been detected, an approximate in-focus position of the objective lens is calculated on the basis of the position P(x, y) of the cell on the stage in accordance with the equation (1) (step 62) and the objective lens is moved to the calculated approximate in-focus position (step 63). Subsequently, an automatic focusing is performed (step 64). In this case, since the objective lens is preliminarily moved to the approximate in-focus position in the vicinity of a true in-focus position, the automatic focusing operation can be rapidly performed. After the automatic focusing has been completed, the cell differentiation is performed in step 65 which corresponds to step 43 in FIG. 4. Upon detection of the completion of the cell differentiation for one sample at step 66, the sample is exchanged for the next sample (step 67) for effecting the cell differentiation for the next sample. The above differentiation process is repeated until step 68 detects the completion of the cell differentiation for all samples to be measured.

In the above-described embodiment, the objective lens has been moved after the stage movement. However, in the case where the stage is step-wise moved by means of a pulse motor, the objective lens may be moved interlocking with the stage in accordance with the equation (1) for each step movement of the stage.

Also, the calculation of the approximate in-focus position is not limited to the linear approximation according to the equation (1) but it may be made through a polynomial approximation, as required.

According to the present embodiment, the automatic focusing operation can be accurately performed for a short time. Also, the present embodiment provides an advantage that a stage having a poor smoothness as compared with the stage required in the conventional automatic focusing control for microscope can be used and hence the stage fabrication can be greatly facilitated.

As has been explained, according to the present invention, the automatic focusing control for microscope can be made accurately and at a high speed by correcting any distortion of the microscope stage. Even if an objective lens of high magnification is employed, it is not necessary to use a high precision stage and hence a driving mechanism of low cost can be used.

We claim:

1. An automatic focusing control method for microscope in a microscope focus adjustment apparatus comprising a microscope including an objective lens and a stage, an objective lens driving device for driving said objective lens in upward and downward directions, a stage driving device for driving said stage in a horizontal direction, and an automatic focusing device for outputting a focus signal representative of an in-focus position of said objective lens on the basis of an electric signal obtained by a photo-electric conversion of the amount of light through said microscope, said method comprising:
   (a) a step of establishing respective in-focus positions of said objective lens for a plurality of points on said stage;
   (b) a step of mounting a sample on said stage;
   (c) a step of determining an approximate in-focus position of said objective lens for said sample on the basis of said in-focus positions of said objective lens for said plurality of points;
   (d) a step of moving said objective lens to said approximate in-focus position; and
   (e) a step of determining an in-focus position of said objective lens for said sample by said automatic focusing device.

2. An automatic focusing control method for microscope according to claim 1, wherein at said step (c), said approximate in-focus position of said objective lens for said sample is determined on the basis of position information of said sample, position information of said plurality of points, and the in-focus positions of said objective lens for said plurality of points.

3. An automatic focusing control method for microscope according to claim 1, wherein at said step (c), said approximate in-focus position of said objective lens for said sample is determined on the basis of the in-focus position of said objective lens for at least one selected point of said plurality of points in the vicinity of said sample.

4. An automatic focusing control method for microscope according to claim 1, wherein at said step (c), said approximate in-focus position of said objective lens for said sample is determined on the basis of position information of said sample, position information of at least one selected point of said plurality of points in the vicinity of said sample, and the in-focus position of said objective lens for said at least one selected point.

5. An automatic focusing control method for microscope according to claim 3, wherein said at least one selected point includes a plurality of points.

6. An automatic focusing control method for microscope according to claim 4, wherein said at least one selected point includes a plurality of points.

7. An automatic focusing control method for microscope in a microscope focus adjustment apparatus comprising a microscope including an objective lens and a stage, an objective lens driving device for driving said objective lens in upward and downward directions, a stage driving device for driving said stage in a horizontal direction, and an automatic focusing device for outputting a focus signal representative of an in-focus position of said objective lens on the basis of an electric signal obtained by a photo-electric conversion of the amount of light through said microscope, said method comprising:
   (a) a step of establishing respective in-focus positions of said objective lens for a plurality of points on said stage;
   (b) a step of mounting a sample on said stage;
   (c) a step of selecting at least one specified point of said plurality of points in the vicinity of said sample on the basis of position information of said sample;
   (d) a step of determining an approximate in-focus position of said objective lens for said sample on the basis of the position information of said sample, position information of said at least one specified point, and the in-focus position of said objective lens for said at least one specified point;
   (e) a step of moving said objective lens to said approximate in-focus position; and
   (f) a step of determining an in-focus position of said objective lens for said sample by said automatic focusing device.

8. An automatic focusing control method for microscope according to claim 7, wherein said at least one specified point includes a plurality of points.

* * * * *